United States Patent [19]

Karras

[11] 4,085,293

[45] Apr. 18, 1978

[54] TRAFFIC USAGE RECORDER

[75] Inventor: Ernest C. Karras, Oak Brook, Ill.

[73] Assignee: Tekno Industries, Inc., Bensenville, Ill.

[21] Appl. No.: 700,021

[22] Filed: Jun. 28, 1976

[51] Int. Cl.² ............................................. H04M 3/36
[52] U.S. Cl. .............................. 179/8 A; 179/175.2 R
[58] Field of Search ............... 179/8 A, 7.1 R, 7.1 TP, 179/7 R, 8 R, 175.2 R, 175.2 C, 15 BF, 9

[56] References Cited

U.S. PATENT DOCUMENTS

| | | | |
|---|---|---|---|
| 3,324,241 | 6/1967 | Bachelet | 179/8 A |
| 3,691,303 | 9/1975 | Davies et al. | 179/8 A |
| 3,761,618 | 9/1973 | Alston et al. | 179/8 A |
| 3,868,480 | 2/1975 | Murgid et al. | 179/8 A |
| 3,916,123 | 10/1975 | Werner et al. | 179/8 A |

*Primary Examiner*—Kathleen H. Claffy
*Assistant Examiner*—Gerald L. Brigance

*Attorney, Agent, or Firm*—Charles A. Laff; J. Warren Whitesel; Howard B. Rockman

[57] ABSTRACT

A traffic usage recorder is used with a telephone switching network to verify the grade of service being given by observing simultaneous traffic on groups of equipments. The recorder has a plurality of input terminals, each of which may be connected with a corresponding input device, such as a sleeve lead which may be marked with a distinctive busy potential. The busy potential indicates circuit usage. The individual sleeve leads are repeatedly scanned in sequence to detect a presence or absence of the busy potential and therefore the circuit usage prevailing at the time of scan. The data derived therefrom is processed to indicate CCS units, peg count, maximum switch usage, and a cumulative time during which the maximum usage occurs. (The term C.C.S. means one hundred seconds of call time). Periodically (such as once every hour), the processed data may be read out in any suitable manner. The traffic usage recorder verifies the statistical tables which are used to make traffic studies.

18 Claims, 7 Drawing Figures

TRAFFIC USAGE RECORDER

This invention relates to telephone service observation equipment and more particularly to traffic usage recorders.

Telephone switching equipment is normally furnished on a percentage basis. That is, all subscribers in a group of 100-lines, for example, never make calls simultaneously. Rather, a statistical survey makes it predictable that no more than perhaps eight of these subscribers in any given 100-line group are busy at any given time. If so, perhaps ten or twelve originating or finder switches will be sufficient to serve this group of lines. The remainder of the switches in the network may be distributed in the same manner. The decision to use ten or twelve switches is made on a basis of probability tables.

One difficulty is that the same probability tables are almost always used for assigning equipment in a switching network. However, it is always possible that any given network does not have traffic patterns fitting the statistical universe embodied in the tables. It is possible that, in the above example, ten or twelve switches either are not enough or are too many. Accordingly, a mere assignment of equipment on a basis of a statistical table is no assurance that the subscriber will receive a satisfactory grade of service. Therefore, public regulatory agencies set standards for the grade of service which must be given to the public buying the telephone service. An operating telephone company is thereafter required to attach a machine to its equipment in order to record the service actually given, and thereby confirm that the standards are, in fact, met.

The service observing equipment usually provides a bulk number which is called a "peg count" and another number called C.C.S. A peg count is nothing more than a table of the total number of times that a given piece of equipment is used. The C.C.S. number represents the total amount of time consumed during any given call.

These two numbers (peg count and C.C.S.) are widely accepted as means for establishing that at least a minimum grade of service is being given. However, these numbers alone do not tell the whole story, and they may be very misleading, to the economic disadvantage of the operating telephone company. For example, calculations based on a peg count and a C.C.S. number may indicate that an inferior grade of service is being given. This would induce the telephone operating company to buy and install more equipment to enable the calculated grade of service to reach standards set by the regulatory agencies.

If the truth were known, maybe there is no need for more equipment. For example, the statistical tables may be based upon a random sampling of calls having, say an average of ten minute duration with a low rate of simultaneous switch usage. In such a traffic pattern perhaps a given number of switches would saturate and cause a deterioration of switching capabilities once an hour. In truth, it is possible that the telephone calls in an actual switching network may last for, say an average of two minutes. In that case, perhaps the group of equipments under observation might reasonably sustain four times as many calls as the same amount of equipment could sustain with ten minute calls.

The foregoing is purely a hypothetical example. Those skilled in the art know of other suitable numbers which could be substituted. The point is that operating telephone companies sometimes add capacity which is not really required. Perhaps they also fail to add much needed capacity.

I have found that a more accurate traffic observation may be had by also observing the maximum equipment usage and the total time that such maximum usage occurs. This measurement of the cumulative parameters of traffic tends to confirm or deny the accuracy of the statistical tables and to assign equipment. For example, there is no need to buy new equipment if an existing equipment group contains, say ten switches and if it can be established that no more than eight switches are ever used simultaneously and that the cumulative total of simultaneous usage of eight switches is only 75 seconds per hours. Hence, I have also found that there are many times when the availability of data relating to a total number of maximum busy switches and maximum busy time usage may confirm or deny the validity of the statistical tables used in traffic surveys.

One difficulty with adding information to the conventional peg count and C.C.S. observations is that an excessive amount of wiring is required. The cost of such excess wiring might very likely exceed the savings realized by the availability of more precise information.

Accordingly, an object of this invention is to provide more service observation related information than was heretofore available. Here an object is to provide different pieces of information relating to both specific circuit usage and total group usage. In this connection, an object is to provide peg count, C.C.S., maximum number busy, and maximum number busy time, all responsive to data collected on a single wire.

Another object is to provide the foregoing service observation without simultaneously increasing installation costs in an excessive manner.

Yet another object is to provide trouble-free equipment, which has self-checking features to insure a proper installation and usage.

Still other objects will occur to these skilled in the art.

In keeping with an aspect of the invention, these and other objects are accomplished by a traffic usage recorder. A plurality of input terminals on the recorder are individually associated with corresponding input devices, which may be any suitable sleeve or other wires, marked with distinctive potentials according to circuit usage. The recorder repeatedly scans each of its input terminals in sequence to detect a presence or absence of the distinctive potential and therefore the circuit usage prevailing at the time of scan. From the data derived on each scan the recorder processes to indicate C.C.S. units, peg count, maximum switch usage, and a cumulative time during which said maximum usage occurs. Optional readouts enable a polling of data from a remote location.

The nature of the invention will become more apparent from a study of the attached drawing wherein:

FIG. 1 is a block diagram illustrating how the invention is used in connection with a conventional telephone switching system;

FIG. 2 schematically illustrates a conventional bell-shaped probability curve, which might be the basis of statistical tables used to equip the system of FIG. 1;

Figure 1:
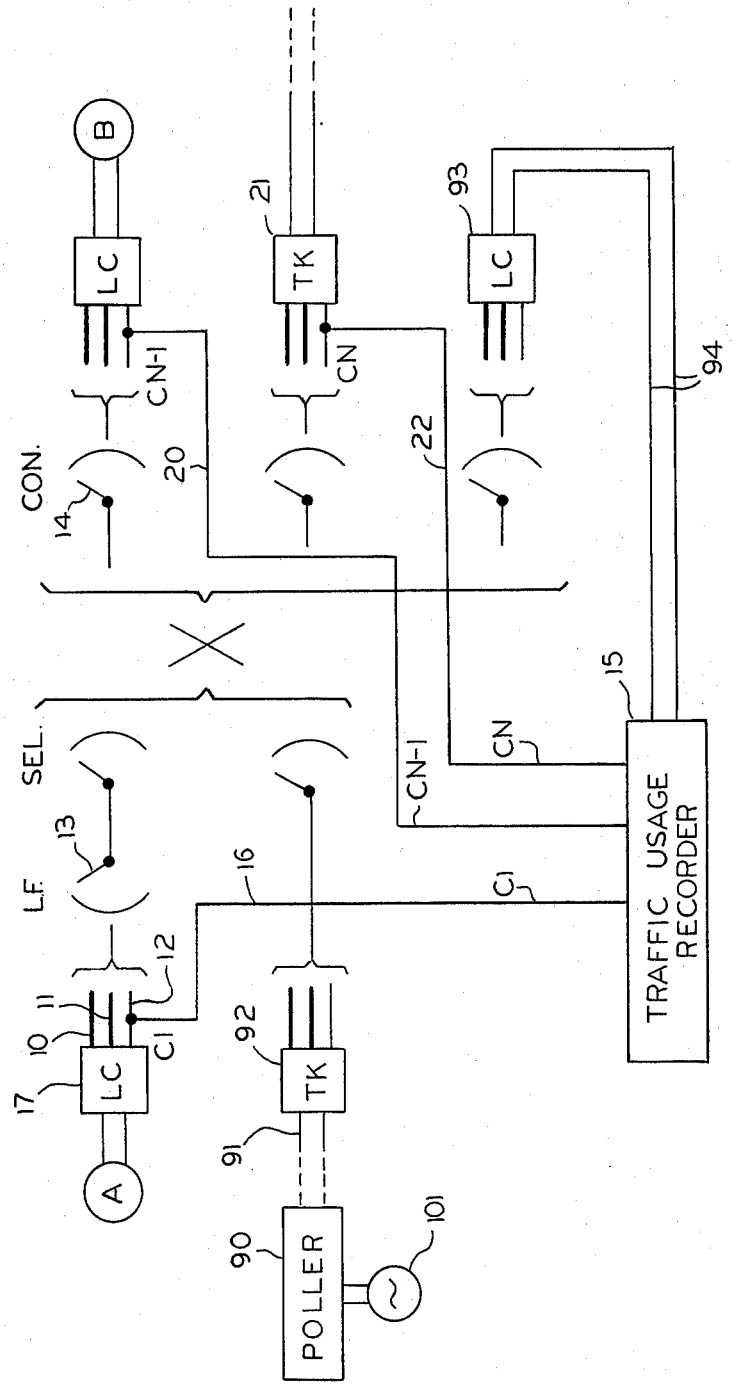

FIG. 1 has been drawn to represent usage of the invention in connection with a step-by-step switching system since the disclosure is thereby made more simple. However, it must be understood that the invention is equally applicable to virtually any switching system regardless of whether it is electronic or electromechanical.

In greater detail, FIG. 1 is here shown as including line circuits (L.C.), and three switching ranks of line finders (L.F.), selectors (SEL.), and connectors (CON.). The calling lines are represented by station A and the called lines by station B. Incoming and outgoing trunks are represented by trunk circuits TK. Any other suitable equipment or number of switching ranks may also be provided.

As is known, each point of switching network access usually has three or four conductors associated therewith, which include tip, ring and sleeve conductors (10, 11, 12), respectively. In some systems, the sleeve lead 12 is called a "C" wire, and that nomeclature is here adopted, although no particular significance should be attached to this adoption.

The sleeve lead is used to hold, control or supervise, and release a talking path through switching system. For present purposes, the important control is that a busy line is signified by an appearance of a "distinctive potential" upon the sleeve lead. In electromechanical systems, this distinctive potential is generally ground and in electronic systems it is often 5 or 6 volts, for example. Therefore, the term "distinctive potential" is intended to cover not only these, but also every other suitable form of observed line marking.

As is conventional, each of a group of lines is assigned to be served by a preselected number of access switches. Therefore, line A is one of perhaps 100-lines which are served by, say 12-line finders, such as switch 13. Likewise, line B is one of 100-lines which are served by a number of connectors 14. Each line finder in a group and each connector in a group are equipped to perform the same functions for each of the 100-associated lines.

From each sleeve or C lead, a connection is extended to the inventive traffic usage recorder 15, which is a separate and usually portable unit that is carried into the central office and placed near the line circuits of the stations to be monitored. Thus, for example, wire 16 leads from the sleeve 12 of line circuit 17 to recorder 15. Anytime that station A is busy, ground appears on sleeve 12 and wire 16. The sleeve 12 (and wire 16) has no potential if station A is idle. Therefore, the recorder 15 is continuously informed as to the busy or idle condition of station A.

In like manner, the busy or idle state of station B is continuously indicated on wire 20 and of trunk circuit 21 on wire 22. The term "CN" is intended to indicate that any suitable number (N) of sleeve leads may be accommodated.

The foregoing comments are based on the assumption that line and trunk circuits are being monitored for traffic usage. However, a telephone central office also has many other different kinds of equipments which are also marked over a control lead in a similar manner. Therefore, the invention may be applied to observe usage on any suitable equipment by connections of wires 16, 20, 22 to the control leads thereof.

For present purposes, it is assumed that there are only two groups of line equipments under observation, which are call originating switches or line finders (L.F.) and call terminating switches or connectors (CON.). There are for example, a suitable number (such as twelve) line finders in a single group of line finders serving 100-subscriber lines represented by station A. Each line finder in the group is wired so that it exactly duplicates the services performed by every other line finder in the group. Therefore, as long as any single line finder remains idle, every idle line in the group of subscribers A has an equal opportunity to seize and operate it.

Figures 2, 3, 4, 5:
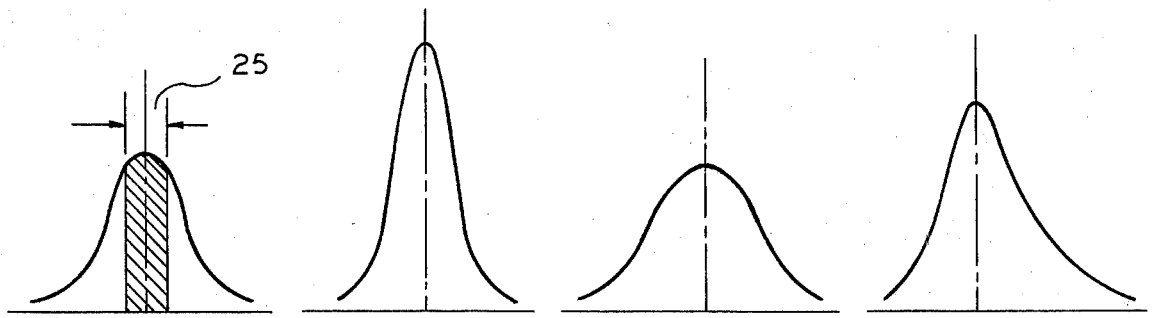
FIGS. 3-5 are schematical representations of how the curve of FIG. 2 may, in fact, vary and thereby depart from the statistical universe which is represented by the statistical tables.

The selection of group size (twelve in the above example) is based upon a conventional bell-shaped probability curve, as seen in FIG. 2. The assumption is that the 100-subscribers in the line group will have telephone habits whereby traffic to the line finders will be in the hatched area 25. However, the 100-subscribers in the group may not have habits which conform to the statistical universe which was analyzed to form the curve of FIG. 2. For example, the curve of FIG. 2 may represent the telephone habits of a mix of home owners and small shop keepers in a small town.

If the finders are used with a different group of 100-subscriber lines in another statistical universe, such as order takers in a very busy discount store with many very short calls, perhaps the proper statistical universe would yield a very narrow and steep probability curve, as in FIG. 3. In a system serving yet another 100-subscriber lines in a universe such as a retired persons' community, there may be few, very long calls. Maybe there would then be an opposite effect yielding a wide curve with a low slope, as in FIG. 4. There could also be skewed results. For example, if an office requires many field representatives to call in every hour, most calls may be bunched near the start of each hour with few calls near the end of the hours, as in FIG. 5.

Normal traffic observing equipment may be assigned on a basis of the probabilities of FIG. 2, when it should be assigned on a basis of FIG. 3. Simple peg count could indicate that many more than twelve line finders should be provided per 100-subscriber line groups; however, the extremely short duration of each call represented by FIG. 3 might really indicate that not even twelve finders per group are required. Conversely, a simple peg count could indicate that the group represented by FIG. 4 do not need even the twelve line finders normally provided, when in truth, the extremely long duration of each call required more than the normal twelve finders.

According to the invention, means are provided for verifying the accuracy of the probability charts. Thus, the invention detects situations such as one where line finders are assigned on a basis of the curve of FIG. 2, when they should be assigned on a basis of one of the other curves of FIGS. 3-5.

Figure 6:
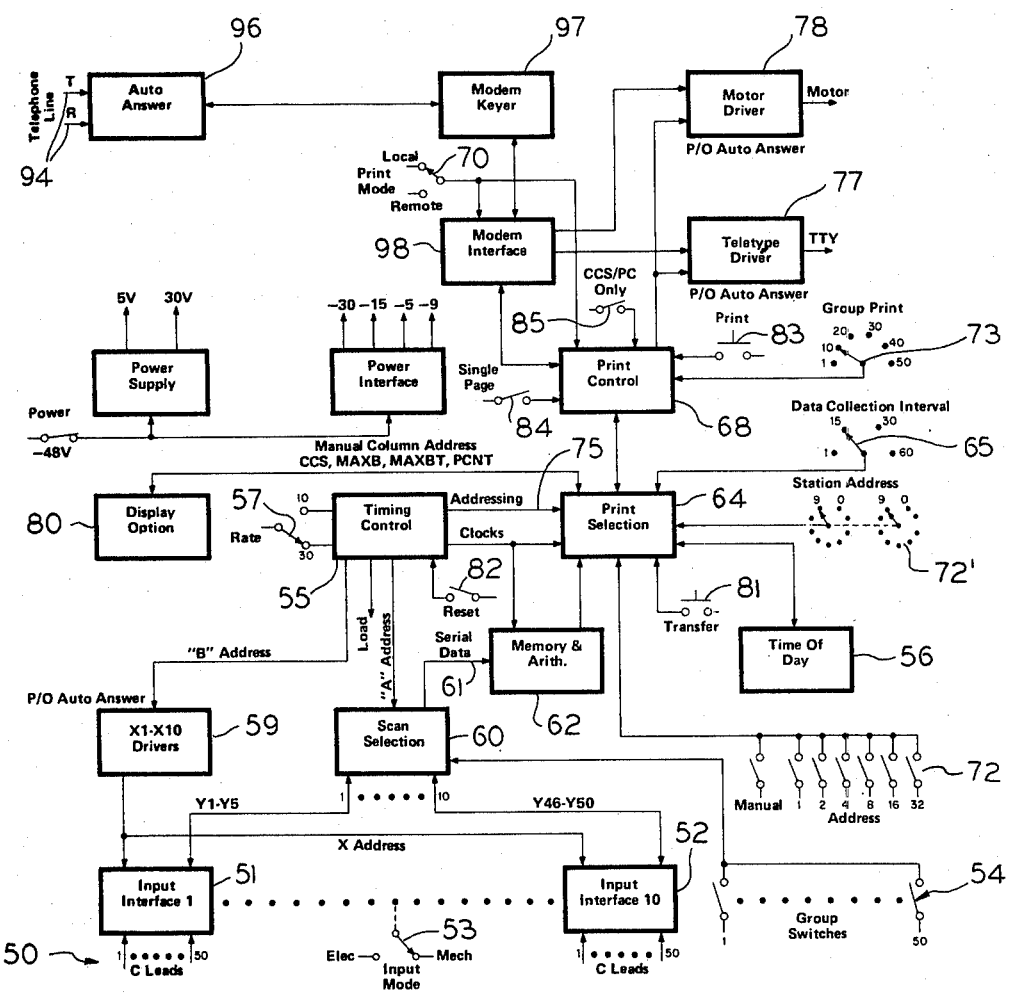
FIG. 6 is a block diagram of the traffic usage recorder.

FIG. 6 is a block diagram of a system which may be used to complete traffic usage recorder 15 in FIG. 1. Any number of C-wires are connected at 50. In this case, there are provisions for ten input interface circuits 51, 52, each containing any number from 1 to 50 (or up to 500-wires) of C-wires. A switch 53 may be provided for any one or for all C-wires to select between an electromechanical ground busy marking or an electronic 5-volt, for example, busy marking.

Suitable group switches 54 may be provided for grouping these 500-inputs in any convenient manner. For example, assume that the 13th, 15th, 25th and 33rd group switches are operated to mark corresponding inputs marked. The first group contains 13 × 10 or 130-C-wires; the second group contains 2 × 10 or 20-C-wires, the third group contains 10 × 10 or 100-C-wires, and the fourth group contains 8 × 10 or 80-C-wires. Any suitable end of scan marking may be provided so that the traffic usage recorder does not scan unequipped input terminals.

The traffic usage recorder provides means for collecting four different forms of data that are present on the C-wire data lines and for interpreting such data in terms of C.C.S. units of usage, peg count, maximum switches busy and the cumulative maximum time that the maximum busy circuits were busy. The C-wire inputs 50 are continuously interrogated, and data derived from the C-wires is stored in an active memories. This collected data is processed and continuously updated in the memory and arithmetic circuit 62. The resulting information is put in storage bins in circuit 62 for transferring into buffer storage at the end of a data collection interval, such as at the end of each hour, for example. It is then translated into a teletype format for either local printout at 77 or input to a modem 97 for transmission to a remote location.

The heart of the traffic usage recorder system is the timing control circuit 55, which is a master clock. The basis for all the timing in the system is derived from a 10 MHz crystal oscillator in circuit 55. This frequency is then divided by counters also located in circuit 55 to provide outputs of different frequencies used to derive timing functions which are used throughout the system. These timing functions include a one second pulse for driving the time of day clock 56, and appropriate pulses for generating a ten or thirty character per second print speed which may be selected by rate switch 57, according to the type of printer used.

The timing circuit 55 also generates the 500-time slots for scanning the 500 C-wire inputs 50. These 500-time slot signals are broken down into pulses forming "A" and "B" addresses which are applied from the timing control clock 55 to a driven circuit 59 and a scan selection circuit 60. The "A" address provides 50-time slots for identifying each of the 50-groups. The "B" address counter provides time slots for identifying each of 10 circuits within each group. Thus, each of the 500-inputs has a unique time slot combination which may be in the order of 20-μsec. long; therefore, it takes 10-msec. to scan the entire 500-inputs.

The input interface circuits 51, 52 may serve 5-groups of 10-inputs per group; therefore, each interface circuit may include gates that will scan up to 500-C-wire inputs. Each group is multiplexed, and the resulting data that is passed through this input interface circuit 51 or 52 to a scan selection circuit 60. The scan selection circuit 60 passes all the data on a group basis and in a sequential manner onto one serial data output bus 61 which filters out the first 10-μsec. of the 20-μsec. pulse. This filtering eliminates switching noise.

The serial data passes from the scan selection circuit 60 to the memory and arithmetic circuit 62. The data that is entered in circuit 62 is stored in a serial memory and is synchronized at all times with the "A" and "B" addresses. Therefore, any data stored in the memory is always identified as a particular piece of information by the time slot during which the information was obtained.

The C-wires or data lines are scanned twice during each one second interval or period, each scan taking approximately 10-msec. During the first scan in each one second period, data is stored in memory 62 according to whether a distinctive potential busy marking is or is not encountered on the scanned C-wire. During the second scan in the same one second period, which occurs approximately 174-msec. after the first scan, data is read off the C-wires and then compared with the data read out during the first scan and now stored in a temporary memory in circuit 62. If the compared data, on the second scan during any one second period indicates busy potentials at the same point that was busy during the preceding scan in the same one second, the data relative to that point is accepted as valid and stored in another memory in circuit 62. Once accepted, the data is simultaneously checked to determine if there is a new call or a continuance of a preexisting call as compared to data stored during the preceding one second period. If a busy potential was not present during the preceding one second period, and if it is now present with new data, a peg count signal is sent, thereby indicating the start of a new call. The location of a peg count meter or memory is irrelevant. In this particular circuit, all memories are located in the same circuit 62.

Arithmetic operations update the active memories in circuit 62 after the second scan in each one second period. In general, there are four such memories for storing C.C.S. information, peg count, maximum busy and maximum busy time. The first memory to be updated is the C.C.S. memory. The valid bits in the memory are added to the existing valid bits stored in the C.C.S. memory. Then, the updated information is reentered in the C.C.S. memory.

Assuming that the grouping is in groups of ten, the data obtained on the individual C-wires are grouped on the basis of ten wires per group so that the information that is now stored in the C.C.S. memory is a total of ten inputs, in binary form. For other groupings, the totals stored in the C.C.S. memory are grouped accordingly.

The next memory to be updated after the second scan during each one second period is the peg count memory, which is done in the same manner as the C.C.S. memory is updated.

On each second scan, the maximum busy memory is interrogated to determine whether the presently maximum number of busy switches is larger than, equal to, or less than the previously stored maximum number of busy switches. Next, the maximum busy memory is updated according to the information that is ascertained on each second scan during each one second period. If the maximum number of simultaneously busy switches is now more than the previously stored maximum number, then this new and greater maximum number is entered, as an increase. If the new maximum number of busy switches is less than the previously stored maximum number, the maximum busy memory retains its previous total, since the same maximum busy number prevails.

The maximum time busy memory is the last memory to be updated during the one second cycle. Time is added to this memory only when an equality exists between the previously maximum busy number and the presently maximum busy number of switches. If there is such an equality at this time, a "1" (one second) is added to the existing total stored in the maximum busy time memory. Thus, for every second scan in each one second period, a "1" is added to the cumulative time stored only if the maximum number of busy switches is the same as the last highest total number of busy switches, thereby giving the total and cumulative time that the maximum busy condition exists. (To convert this one second time accumulation to C.C.S. numbers, the stored time is divided by 100.) If a new maximum is established, the count in the maximum busy time memory reverts to zero, thus beginning a new count. If the second scan in any one second period indicates that fewer switches are busy during that one second, the maximum busy time memory retains its previous count.

Hence, it is seen that the maximum busy time memory stores the total cumulative amount of time during which the maximum number switches are busy. For example, assume that recording and reporting is on an hourly basis. During the first ten minutes, assume that the maximum number of switches simultaneously busy is five switches out of twelve, and that the five switches busy condition occurred on three separate occasions which lasted 7, 10 and 6 seconds, respectively. Thus, at the end of such first ten minutes, the maximum busy switch memory stores "5" and the maximum busy time stores "23" (7+10+6). If there are no more than a maximum of four simultaneously busy switches during the remainder of the hour, the memories still store "5" and "23" at the end of the hour. After that hour they are reset to zero preparatory to recording the count during the next hour.

On the other hand, if it is assumed that the maximum number of simultaneously busy switches raises to "9" during the last fifty minutes of the hour, the memories reset from "5" and "23" to zero. Then, the maximum busy switch memory resets to "9", and the maximum busy time stores counts the cumulative total amount of time during which nine switches are simultaneously busy during the last 50 minutes. In a similar manner, the circuit may be reset any number of times to reflect any increase in the number of simultaneously busy switches.

Again, assuming that an hour is the desired recording and reporting period, switch 65 is set at "60". At the end of each hour, the updated valid data in each of the active memories is loaded into the print selection circuit 64. However, if some other recording and reporting period is desired, the data collection interval switch 65 is set to some other of the readings, which are: 1 second, 15 minutes, 30 minutes, or 60 minutes. That setting then determines when the load command occurs to cause the transfer of stored data into circuit 64.

The load command occurs at the end of the recording and reporting period selected by switch 65 and immediately after all of the C-wire inputs have been scanned for the second time during a one second period, followed by the resulting update cycle. The data that was stored in the active memory 62 is transferred into a buffer memory located in circuit 64. From there, it is read out by command of the print control circuit 68, which may be at any time during the next recording and reporting period, either automatically or responsive to a manual control.

If print mode switch 70 is in the "local" mode selection position, the printout is automatically initiated when the transfer of data from memory 62 to print selection circuit 64 occurs. If switch 70 is in the "remote" position, the read out is under control of poller 90 (FIG. 1).

In addition to the stored data, the print selection circuit 64 adds a numerical identification, derived from the setting of station address switch 72, for identifying the reporting traffic usage recorder. The time of day circuit 56 supplies clock and calendar information. A switch 73 may be set to halt the read out after a suitable number of C-wires have been read. Thus, for example, if only the first thirty groups of input terminals are equipped, switch 73 is set on "30" and the machine terminates its read out after the status of the first 30 groups of C-wires have been read out.

The timing control circuit 55 transmits signals over wire 75 to the print selection circuit 64 to establish the format of the read out data. Also, the arithematic unit in circuit 62 makes any suitable computations, based on the collected data, so that the read out will be more meaningful.

The print control circuit 68 transmits its data to a teletypewriter 77, and to its motor driver 78 along with the supplemental information, such as time of day, etc., furnished by the peripheral equipment. The information read out after any scan may also be displayed at a local display 80.

In order to check the original installation connections of the C-wires, the switch 65 may be placed on its "1" terminal, which means that there will be a read out after the first complete one second time period. If each C-wire is artificially marked busy, the read out should coincide with that busy marking, thereby confirming both the proper installation and the operation of the traffic usage recorder. Conveniently, this read out may be viewed at the local display option 80. While any of many displays may be provided, for testing purposes, it is usually enough if the display indicates the total number of busy lines found during the first scan.

Push button 81 may initiate a transfer of data to the print selection circuit 64 at anytime selected by the operator. Push button 82 may be operated at anytime to reset the system and cause it to restart collecting data. Push button 83 may be operated to print out, or otherwise display the collected data at anytime. Push button 84 reads out the data, a page at a time, in case only a limited amount of information is required. Push button 85 eliminates the maximum busy and maximum busy time read out so that the system functions as a conventional C.C.S. and peg count meter, if desired.

The inventive traffic usage recorder 15 may be installed at a remote telephone office and read from a central location. For this purpose a poller 90 (FIG. 1) may be connected at the central office end of a trunk line 91. This trunk line terminates on trunk circuit 92 located in the remote telephone office. There, it gains access to the switching network in the same manner that all trunk circuits gain access thereto. The switching network may be operated in a normal manner to seize a line circuit 93 connected via wires 94 to the traffic usage recorder 15.

These same wires 94 also appear in the upper left hand corner of FIG. 6, where they connect to an automatic answering device 96. The automatic answer circuit triggers a modem 97 and modem interface 98, preferably responsive to the detection of ringing current on line 94. That detection may cause circuit 96 to bridge the line 94 and thereby operate a conventional line relay in the central office. The operation of the line relay trips ringing.

Before any data is transmitted to the central office, a handshake routine is completed between the traffic usage recorder 15 and poller 90. More particularly, when the modem keyer 97 is connected to the line 94, it filters and detects a carrier tone supplied from oscillator 101 (FIG. 1) through the poller 90. In order for a verification to occur so that data will be transmitted, this carrier must last for a time period which is greater than 800 msec. followed by a 400 msec space. If the mode switch 70 is in the "remote" position, this verification starts a print-out cycle, and the information stored in the traffic usage recorder is transmitted to the poller 90 via the modem keyer 97. After all of the data is transmitted, a release cycle is initiated by the print control circuit 68, which resets the system to normal.

If verification does not occur after the modem 97 is activated, the traffic usage recorder will hang up after 16 seconds. Also, if the carrier is lost for 200 msec. or more, hang-up will occur after 16 seconds.

The modem interface circuit 98 includes a code detector which is used for remote dumping of data in the active memories. In other words, if the polling unit 90 starts a collection of data at a certain time, it sends out a remote interval reset code to the traffic usage recorder. The initial handshake routine is completed as previously described. Depending on strapping options in the modem interface, the data can be transferred and a new collection interval started with no transmission, or the data can be transferred and subsequently transmitted to the poller 90 in any of many different modes, methods and styles.

Figure 7:
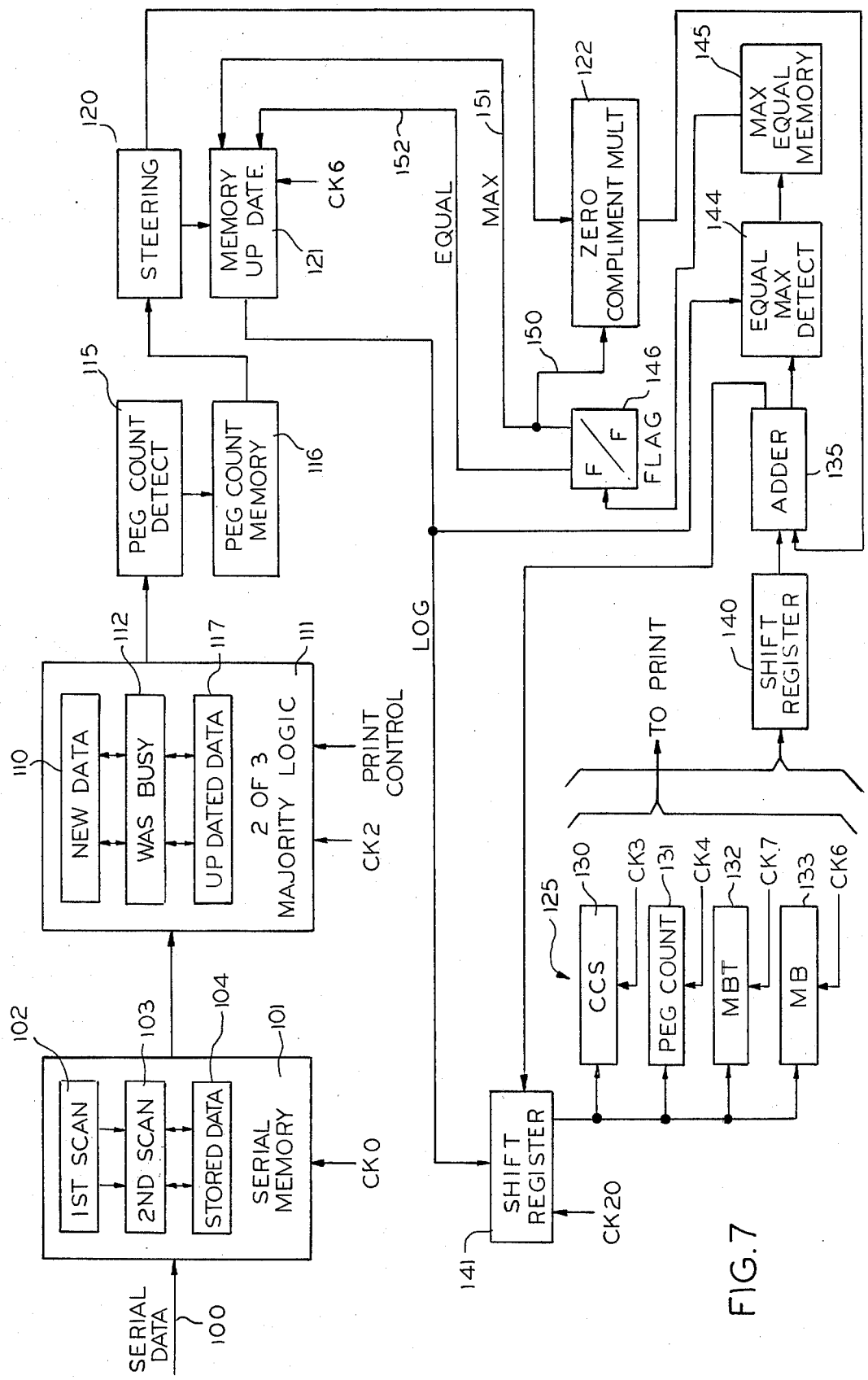
FIG. 7 is a block diagram of the memory and arithematic circuit of FIG. 6.

FIG. 7 is a block diagram which shows details of the memory and arithematic circuit 62 of FIG. 6. These circuits are operated sequentially under the control of a timing control circuit 55 and clock pulses generated thereby, which are here designated by the symbols "CKO...CK 20." This means that a circuit controlled by a clock pulse "CKO" operates first and the circuit controlled by a clock pulse "CK 20" operates last; then the cycle repeats. Other clock pulses CK 1, CK 2, ... etc. causes circuits to operate during each cycle and in the time position indicated by the numerical suffix to the letters "CK."

The data received from each of the individual C-wires 50, during each scan, appears on the "Serial Data" lead 61 in FIG. 6 or 100 in FIG. 7. During each one-second period, a serial memory circuit 101 receives and stores in a first scan register 102 all data, as it is derived from the scanned lines 50. During the second scan, similar data derived from the C-wires 50 is stored in a second scan register 103. The stored data register 104 already stores similar data which was developed one second earlier, during the last preceding scan.

The second scan circuit 103 compares the data stored in the first scan circuit 102 and the data stored in the memory 104. This comparison produces a signal indicating that the data read from the C-wire is either apparently valid or invalid. If the new data appears to be valid, the second scan memory 103 circuit causes the same data to be stored in the data memory 104, where it is available for making a similar comparison during the next scan of the C-wires. The cycle is repeated for each C-wire one second later.

The apparently valid data in second scan circuit 103 is transferred during clock pulse CKO into a new data memory 110 of a 2-of-3 majority logic circuit 111. This circuit compares data stored in three memory circuits 110, 112, 117 and accepts, as valid, that information which is the same in two memories. In greater detail, during clock pulse CK2, this new data in memory 110 is compared with stored data in a was-busy memory 112, which decides whether the new data represents a call in process or a newly placed call. If it is a new call, a signal is sent from the was-busy circuit 112 to a peg count detector 115 and then to a peg count memory 116. Simultaneously, a signal is sent from the was-busy circuit 112 to store new call information in an updated memory 117, preparatory to the next scan.

The information stored in the peg count memory 116 is transferred through a steering circuit 120 to a memory update circuit 121 and simultaneously therewith, a zero complement multiplex circuit 122.

At all times after the initial scan during any reporting period, the four pieces of data which are observed by the inventive circuit are separately stored in each of four individually associated memories 125. More particularly, CCS information is stored in a memory at 130, peg count at 131, maximum busy time at 132, and maximum number of busy switches at 133. This information is accumulated throughout the entire reporting period selected by switch 65. Then, at the end of the reporting period, the memories 125 are read out to a printer or other data collector and reset to zero. Thereafter, the process repeats throughout the next reporting period.

The function of the circuit of FIG. 7 is to compare the current data, being forwarded through the steering circuit 120, with the previously derived data stored at 125 throughout the reporting period. This comparison is made during the part of each one second period following the completion of the second scan. This period following the second scan is divided into discrete functional periods by clock pulses. In principle, the data stored in each of the memories 125 is read out through shift register 140 and adder 135 to a temporary storage in a second shift register 141. Then, it is updated, if necessary, and returned to the appropriate memory when a conductor marked "LOG" is energized. The shift register 141 ideally has a capacity of 20-bits so that each of 8-bits of information is stored in every other register bin, with intermediate bins left unused, thereby using a 16-bit capacity. The remaining four of the twenty bits are used for synchronizing. The terms stored at the 20-bit shift register 141 are added to the terms derived from the current scan and sent through steering circuit 120, to thereby produce updated information. The updated information then stored in shift register 141 is transferred into memory circuits 125 during a clock pulse which is late in the cycle, such as pulse CK 20.

In greater detail, the current data is sent from steering circuit 120 to zero complementary multiplexer circuit 122 where it is inverted (i.e., a "O" is converted into a "1" and a "1" into a "0"). This complementary binary word signal is sent to the lower input of the adder 135. The data stored in memories 125 is applied to the upper input of adder 135. Therefore, if the same data is stored in both memories 125 and complementary multiplexer 122, the resulting output adds to all "1'"s on wire 136, for an entire binary word.

During the clock pulse CK 3, the CCS data stored in the CCS memory 130 is applied through shift register 140 to the upper input of adder 135. If the same data appears at its lower input, adder 135 sends to register 141 the information from memory 130, plus a "true" one pulse for each busy C-wire in a preselected group under observation. The group may contain any number of C-wires from 1 to 250. This "one" pulse per busy C-wire increases the count stored in the CCS memory 130 by one second multiplied by the number of busy C-wires in a group. Thus, there is an additional one second of conversation time added to the stored conversation time for all existing calls within the observed group.

During the clock pulse CK 4, the peg count memory 131 is read out through the shift register 140 to the adder 135. Again, there is a comparison of this information with the information received from the zero complement signal circuit 122. The adder 135 causes signals to be sent to the shift register 141 if the data received from the steering circuit 120 indicates that a peg count is appropriate (i.e., if a new call has been initiated within the observed group). If the observed group is one wire, obviously there can be only one peg count during any one second scan period. However, if there are, say 100-lines in the observed group, there might conceiveably be 100-peg counts, assuming that there is enough capacity to service 100-simultaneously initiated calls.

A feature of the circuit is that the peg counts are totalized on a per group basis. Thus, in the above example of 100-peg counts, the number "100" is stored in a single register. Heretofore, it has not been possible to totalize both usage and peg count from single wires. Either there has been a separate register per observed circuit or separate leads for CCS and peg count.

During the clock pulse CK 6, the maximum busy memory circuit 133 is read out through the shift register 140 to adder 135. This read out occurs at the end of the scan of all C-wires during each one-second scan period; therefore, the maximum number of switches in use is the maximum number for all busy wires in the scanned groups. Hence, the maximum number found during the scan being described is compared with the maximum number found during any preceding scan within the reporting period, and stored in a memory 133 and in max-equal memory 145.

There is an "equal" when the complement signal from circuit 122 and the data stored at 140 causes a "1" in all binary word positions in the adder 135 and on wire 136. If the current maximum number is higher than the previously highest maximum number, the count stored at 144 is driven into overflow and a memory circuit 145 responds to set a flag flip-flop 146 which energizes a "MAX" output lead 151. Responsive thereto, a signal on wire 150 resets the maximum busy switch number in the zero complement multiplex circuit 122 and a new number in the adder 135 is sent to the shift register 141. The new number stored in the adder 135 was taken from data stored in the zero complementary multiplexer 122 before it was reset. The signal on wire 151 causes the memory update circuit 121 to store the new maximum number.

If there was an equality between the new and old maximum busy numbers, the equal wire 152 is energized and the memory update circuit 121 marks the LOG wire during clock pulse CK 6. If there is less than equality, the equal wire 152 is not marked, and pulse CK 6 causes circuit 121 to mark the LOG wire. Either way, shift register 141 again stores in memory 133 the same existing maximum switch busy number which was just read out of memory 133. Again, storage is the basis on a group of observed circuits.

During the seventh clock pulse CK 7, the adder 135 transmits one pulse to shift register 141 if the flag flip-flop marks equal wire 152 and an equality is indicated between the number stored in the maximum busy register 133 and the maximum number stored in the zero complement multiplexer 122. This "1" indicates that one second is added to the cumulative time stored in register 132. Thus, memory 132 always stores the cumulative total time during which the maximum number of switches stored at memory 133 were busy, during a reporting interval.

To print out the information stored in the memories 125, an input 160 is energized in any suitable manner. Responsive thereto, the memories 125 are ordered to transmit information over the output conductors 161, to the print selection circuit 64. Thereafter, all memories reset to zero.

The print out is explained by the following table of hypothetical data. It is assumed that all calls reported in second "1" are initiated during second "1". Column 1 indicates the number of busy circuits (C-wires) in an observed group. Column 2 indicates the CCS stored in memory 130. Column 3 indicates the peg count stored in memory 131. Column 4 indicates the maximum busy number stored in memory 133. Column 5 indicates the maximum busy time stored in memory 132.

| One Second Scan Period Being Reported | 1 | Print Out | | | |
|---|---|---|---|---|---|
| | | 2 CCS | 3 PC | 4 MB | 5 MBT |
| 1 | 10 | 10 | 10 | 10 | 1 |
| 2 | 10 | 20 | 0 | 10 | 2 |
| 3 | 9 | 29 | 0 | 10 | 2 |
| 4 | 12 | 41 | 13 | 12 | 1 |
| 5 | 9 | 50 | 0 | 12 | 1 |
| 6 | 12 | 62 | 16 | 12 | 2 |
| 7 | 6 | 68 | 0 | 12 | 2 |

Thus, during seven successive one second scan periods, the memories would store the above information. Of course, the data would not change as quickly as reported above since so many calls could not originate and terminate within seven seconds.

Those who are skilled in the art will readily perceive how various modifications may be made, without departing from the spirit and scope of the invention. Therefore, the appended claims are to be construed to cover all equivalent structures.

I claim:

1. A traffic usage recorder for observing traffic through a plurality of telecommunication circuits, each having at least one individually-associated wire, said recorder comprising a plurality of input terminal means, each of said terminal means providing an access point which may be connected to the wires asociated with said circuits to thereby connect said circuits to said recorder, said circuits marking the wires individually associated therewith by a distinctive potential according to the usage of the circuit, means for repeatedly scanning each of said input terminal means to detect a presence or absence of said distinctive potential upon said wires and therefore the usage of the associated circuit prevailing at the time of the scan, means for combining said data on individually-associated wires into grouped data concerning groups of mutually-related wires, and means responsive to data derived from each of said terminals for indicating C.C.S. units, peg count, and responsive to said grouped data for indicating maximum simultaneous switch usage, and a cumulative time during which said maximum usage occurs.

2. The recorder of claim 1 wherein said access means is via one wire per observed circuit.

3. The recorder of claim 2 wherein said observed circuits comprise switching equipment connected to subscriber or trunk line equipment, each of said wires represents an individual line served by said switching equipment, and means for grouping said wires on a basis of common access to the usage of the switches connected to a common group of lines in order to provide said grouped data.

4. The recorder of claim 2 wherein each of said wires is a sleeve lead of an associated line and said distinctive potentials are busy markings appearing on said sleeve leads when the associated line is in use.

5. The recorder of claim 1 wherein said scanning means comprises means for scanning each of said terminals at least twice during each of a plurality of successive time periods, each of said time periods having the same duration, and means for accepting as valid, data derived during the first scan in each of said time periods if the same data also appears during the second scan in the same time period.

6. The recorder of claim 5 wherein said each of said access means is via a one wire sleeve lead and said distinctive potentials are busy markings applied to said sleeve leads.

7. The recorder of claim 6 and means for sending said peg count signal responsive to each of said busy markings if a corresponding busy marking did not appear during the immediately preceding one of said time periods.

8. The recorder of claim 5 wherein each of said wires is a sleeve lead which represents an individual line served by call originating switches in a telecommunication office, means for grouping said wires on a basis of the grouping of lines served by a common group of call originating switches, whereby said maximum switch usage and said cumulative time refers to maximum usage and time accumulation within the group of common call originating switches, first memory means for storing the maximum number of busy switches of common usage during each of said time periods, and second memory means for storing a signal indicative of the duration of said time periods when the maximum number stored in any give time period is equal to the maximum number stored during any time period preceding the given time period.

9. The recorder of claim 8 and means for resetting to zero the first and second memory means when the maximum number stored in any given time period is greater than the maximum number stored during any time period preceding the given time period, and means for thereafter storing the greater maximum number in said first memory.

10. A data collecting device for observing service and verifying the accuracy of statistical tables used to assign equipment used in telephone networks, said device comprising means for repeatedly scanning a plurality of wires to collect bits of data appearing on said wires as a function of groups of circuit usage, said data representing traffic through a group of any of a plurality of circuits in said networks and associated with said wires, means responsive to each scan for collecting data and for comparing said collected data with previously collected data, first memory means responsive said comparison means for storing a peg count signal when there is a change on a wire from an idle to a busy status, second memory means responsive to said comparison means for storing an accumulating call time usage (C.C.S.) signal, third memory means responsive to an indication of the cumulative number of wires in a group having a busy status at any given time for storing a memory of a maximum number of circuits in simultaneous use during a given scan, and fourth memory means responsive to an equality between the maximum number being stored and the maximum number previously stored in said third memory means for storing an accumulating maximum number time signal, whereby said fourth memory means stores the total time during which a maximum number of busy circuit condition persists.

11. The device of claim 10 and means for resetting the third memory to store a new maximum number and for resetting the fourth memory means to start a new cumulative counting process when the maximum number being stored is greater than the maximum number previously stored in said third memory means.

12. The device of claim 11 and remotely located means for polling said memories from said remote location and means associated with said device for reading out the data in each of said memory means responsive to said polling means.

13. The device of claim 12 and means in said polling means for transmitting a signal of a predetermined characteristic to said device, and means in said device for operating said read out means responsive to the receipt of said predetermined characteristic.

14. The device of claim 11 wherein each of said wires is a sleeve lead of a line and said busy and idle status are signaled by potentials selectively applied to said sleeve leads.

15. The device of claim 14 wherein said scanning means comprises a clock driven means, each of said sleeve leads being individually identified by time slot signals derived from said clock, and means for giving each of said sleeve leads time shared access to said memories during individual ones of said time slots.

16. The device of claim 10 and means common to a group of observed circuits for storing totalized peg count and C.C.S. data for the group responsive to data received over a single wire per observed circuit.

17. The device of claim 16 and means common to said group of circuits for also storing said maximum number and accumulated maximum number time for the group responsive to the same data received over the same single wires per observed circuit.

18. A circuit for observing traffic in predetermined groupings of a plurality of telecommunications equipments, said circuit comprising means for marking each of a plurality of single wires per equipment with a distinctive potential when the equipment associated with a wire is busy, and means responsive to said distinctive potentials for detecting C.C.S. data and peg count, means for totalizing said data and count for all of said plurality of wires in each predetermined group, and means for storing said totalized data and count to indicate simultaneous use of wires within a group.

* * * * *